United States Patent [19]
Tsuboya et al.

[11] 3,962,401
[45] June 8, 1976

[54] METHOD OF RECOVERING NEPTUNIUM FROM SPENT NUCLEAR FUEL

[75] Inventors: Takao Tsuboya, Tokai; Sinichi Nemoto, Naka; Tadaya Hoshino, Tokai; Chuzaburo Tanaka, Komae, all of Japan

[73] Assignee: Doryokuro Kakunenryo Kaihatsu Jigyodan, Tokyo, Japan

[22] Filed: Oct. 5, 1973

[21] Appl. No.: 403,976

[30] Foreign Application Priority Data
Oct. 7, 1972 Japan............... 47-100829

[52] U.S. Cl.................. 423/10; 423/250
[51] Int. Cl.² .................. C01G 56/00
[58] Field of Search................ 423/250, 10, 8

[56] References Cited
UNITED STATES PATENTS

| | | | |
|---|---|---|---|
| 2,847,276 | 8/1958 | Butler | 423/10 |
| 3,359,079 | 12/1967 | Bathellier | 423/253 X |
| 3,374,068 | 3/1968 | Erlandson et al. | 423/10 X |
| 3,652,233 | 3/1972 | Swanson | 423/10 |
| 3,714,324 | 1/1973 | Weech | 423/10 |

OTHER PUBLICATIONS
Gourisse (I), Nuclear Science Abstracts, 26, 2426, Abs. No. 25412, (June 1972).
Nuclear Science Abstracts, 25, 3166, Abs. No. 32040, (July 1971).
Srinivasan et al. (I), Nuclear Science Abstracts, 24, pp. 1157 and 4923, Abs. No. 11646 and 50447, (1970).
Gourisse (II), Nuclear Science Abstracts, 25, 399, Abs. No. 4135, (1971).
Srinivasan et al. (II), Nuclear Science Abstracts, 26, p. 2971, Abs. No. 30929 and 30930, (1972).

*Primary Examiner*—Benjamin R. Padgett
*Assistant Examiner*—Edward A. Miller
*Attorney, Agent, or Firm*—Wenderoth, Lind & Ponack

[57] ABSTRACT

An improved Purex wet recovery process including the step of extracting and separating uranium and plutonium simultaneously from the fission products in the presence of nitric acid and nitrous acid by using a multistage extractor unit having an extracting section and a washing section is provided for separating and recovering neptunium simultaneously with uranium and plutonium contained in spent nuclear fuel. The improved method comprises the steps of maintaining the nitrous acid concentration in said extracting section at a level suited for effecting oxidation of neptunium from (V) to (VI) valence, while lowering the nitrous acid concentration in said washing section so as to suppress reduction of neptunium from (VI) to (V) valence, and maintaining the nitric acid concentration in said washing section at a high level.

7 Claims, 2 Drawing Figures

3,962,401

METHOD OF RECOVERING NEPTUNIUM FROM SPENT NUCLEAR FUEL

BACKGROUND OF THE INVENTION

This invention relates to a Purex wet process, or a method of reprocessing spent nuclear fuel, and more particularly to an improved method of recovering neptunium which is one of the transuranium elements contained in spent nuclear fuel.

The primary object of the Purex wet process is to separate uranium and plutonium contained in spent nuclear fuel from the fission products. Heretofore, neptunium, which is one of the transuranium elements contained in spent nuclear fuel, has not been included among the main object matters to be recovered in the Purex wet process, and it has been either separated together with uranium and plutonium from the fission products or together with the fission products from uranium and plutonium. Neptunium per se has a long half-value period of decay and hence can not be utilized immediately as a radiation source. Also, as it is not a fissile material by nature, it can not be reused as nuclear fuel. However, neptunium can become a parent element of plutonium-238 which is produced by neutron irradiation in for instance a nuclear reactor. This plutonium-238 is very useful as radioisotope which has the highest utility value among the various radiation sources. Therefore, it is lately attempted to efficiently separate and recover neptunium in the Purex wet process of spent nuclear fuel. For efficient separation and recovery of neptunium, there is usually employed a method in which neptunium is separated from the flow of uranium and plutonium while preventing, as much as possible, neptunium from flowing out into the highly radioactive waste liquid of high beta-ray and gamma-ray concentration produced by fission products. It is necessary to minimize complication of the equipments and treating method under thick gamma-ray protective shield. Also, recovery of neptunium should not impair separation of uranium and plutonium from the fission products, which is the primary object of the Purex wet recovery process.

The Purex wet process is a method in which the spent nuclear fuel is dissolved in nitric acid and uranium and plutonium are selectively extracted in tributyl phosphate (hereinafter referred to as TBP) which is an excellent solvent for the extraction of uranium and plutonium, and then these elements are separated from the fission products.

A typical example of the conventional Purex wet recovery process is systematically illustrated in FIG. 1. Spent nuclear fuel undergoes a pre-treatment and then is dissolved in nitric acid, and then the mixed solution, after being adjusted in its composition, is subjected to a solvent extraction treatment. The solvent extraction treatment is roughly divided into four steps: decontaminating step, distributing step, uranium refining step, and plutonium refining step. In the treatment, uranium and plutonium are adjusted to an atomic valency suited for processing in each step. In the decontamination step where first and second extractors are used, uranium and plutonium are extracted with a (VI) valence and a (IV) valence, respectively, by TBP in the first extractor and separated from the fission products, and then in the second extractor, both uranium and plutonium which have thus been extracted in the TBP phase, are back-extracted in an aqueous liquid phase with the same valency. In the drawings, the fission products are denoted by F.P. and double parentheses (( )) indicate that the element in such double parentheses exists only in a minute amount. In the distribution step which includes third, fourth and fifth extractors, the aqueous solution of uranium and plutonium which have been back-extracted in the second extractor is supplied into the third extractor where both uranium and plutonium are again extracted with TBP under the same valency to further expedite separation from the fission products. In the fourth extractor, although uranium is maintained at a (VI) valence, plutonium is adjusted to a (III) valence, and the former is distributed in the TBP phase while the latter in the aqueous liquid phase. The TBP-phase uranium, while kept at a (VI) valence, is back-extracted into the aqueous liquid phase in the fifth extractor. The uranium refining step comprises the sixth and seventh extractors in both of which uranium is extracted and back-extracted while maintained at a (VI) valence and separated from plutonium (which exists mixed at a small concentration) and the fission products. In the plutonium refining step which includes eighth and ninth extractors, plutonium which has previously been distributed in the aqueous liquid phase in the fourth extractor is adjusted to a (IV) valence, then extracted with such valence in the eighth extractor and then recovered from the nineth extractor in the form of a highly refined aqueous solution adjusted to a (III) valence.

Thus, in the conventional Purex wet process, neptunium which exists mixed with uranium and plutonium has not been involved among the main object substances to be recovered, and it has been either separated into the waste liquid together with the fission products or separated from the fission products together with uranium and plutonium, and in the latter case, neptunium has not been ultimately recovered but separated into the waste liquid.

SUMMARY OF THE INVENTION

The present invention relates to an improvement over the above-described conventional Purex wet recovery process, and it is intended to realize effective recovery of not only uranium and plutonium but also neptunium which exists in spent nuclear fuel. More specifically, there is provided according to the present invention an improved Purex wet recovery process for separating and recovering uranium and plutonium in spent nuclear fuel from the fission products, wherein there is used a multistage extractor unit consisting of an extracting section and a washing section, and characterized in that, in the step of separating and extracting uranium and plutonium simultaneously from the fission products in the presence of nitric acid and nitrous acid, the nitrous acid concentration in said extracting section is maintained at a level suited for effecting oxidation of neptunium from Np(V) to NP(VI), while the nitrous acid concentration in said washing section is lowered so as to suppress reduction of neptunium from NP(VI) to Np(V), thereby to provide an optimum nitrous acid concentration gradient in the extractor unit, while maintaining the nitric acid concentration in said washing section at a high level.

In the prior art Purex wet process, the atomic valency of plutonium has been suitably adjusted as described above. In recovering neptunium, it is also required to adjust the valency of neptunium. Usually, neptunium can assume either Np(IV), Np(V) or Np(VI), of which Np(VI) can be most efficiently extracted with TBP which is an extraction solvent, while Np(V) is most difficult to extract. Therefore, in order to prevent neptunium from flowing out into the highly radioactive waste liquid composed of fission products, it is necessary to maintain the neptunium valency at (IV) or (VI) and to extract neptunium together with uranium and plutonium with the TBP extracting reagent in the first extractor in the decontamination step as well as in the third extractor in the distribution step, that is, in the step of extracting and separating uranium and plutonium simultaneously from the fission products by using the TBP reagent.

However, since neptunium existing in the liquid supplied to the extraction step is mostly of Np(V), it is necessary for effecting solvent extraction to oxidize neptunium from Np(V) to Np(VI) or to reduce it from Np(V) to Np(IV). In case of oxidizing neptunium to Np(VI), due consideration should be paid to the simultaneous oxidation reaction of plutonium from Pu(IV) to Pu(VI), while in case of reducing neptunium to Np(IV), regard must be given to the reduction reaction of plutonium from Pu(IV) to Pu(III). In other words, the oxidation-reduction potential of neptunium of the type considered is closely analogous to that of plutonium, so that selection of the reducing or oxidating agents used for the reducing or oxidizing reaction of neptunium is limited to a very narrow range. According to the present invention, however, it is possible to oxidize neptunium to a (VI) valence while maintaining the plutonium valency at (IV) by supplying nitrous acid such that a suitable concentration gradient will be provided in the extractor.

DETAILED DESCRIPTION OF THE INVENTION

Figure 1:
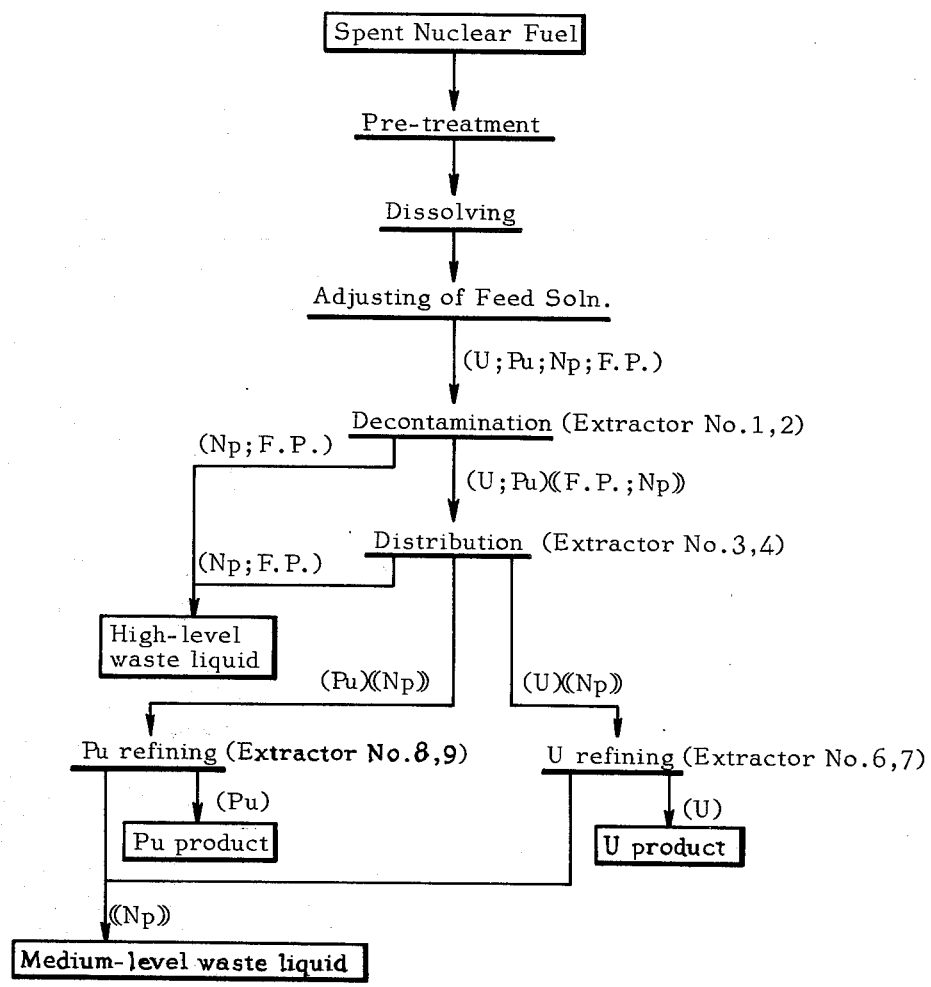
FIG. 1 is a process chart of a conventional Purex wet recovery process.

The method of the present invention is based on the theory expressed by the following reaction rate formula and chemical equilibrium formula:

Reaction rate formula:

$$\frac{d[Np(VI)]}{dt} = -\frac{d[Np(V)]}{dt} = 89 [NO_2]([Np(V)]-[Np(V)]_{eq}) \quad (1)$$

Chemical equilibrium formula:

$$\frac{[Np(VI)]_{eq}}{[Np(V)]_{eq}} = 1.2 \times 10^{-3} \cdot [NO_2]^{-1/3} \cdot [HNO_3]^2 \quad (2)$$

In the above formulae, square brackets [ ] indicate concentration and eq stands for equilibrated condition, and these equations can be established at room temperature.

The reaction rate formula (1) dictates that the reaction between Np(V) and NP(VI) is accelerated proportional to the nitrous acid concentration and that deviation from the equilibrium condition of neptunium in that system determines the direction of the oxidation-reduction reaction. The equilibrium condition at that time is determined by the nitrous acid concentration and nitric acid concentration as shown in formula (2). That is, the Np(V) ratio is increased as the nitrous acid concentration increases, while the Np(VI) ratio is increased as the nitric acid concentration rises. It is known from the formulae (1) and (2) that in case of oxidizing Np(V), if the nitrous acid concentration is increased, equilibrium is reached at a higher speed but the Np(VI) ratio obtained at the equilibrium condition is lowered.

Even in case of recovering uranium, plutonium and neptunium separately from each other ultimately, neptunium is first extracted along with uranium and plutonium in the TBP phase in the decontamination step. The extractor used there usually has a plurality of extracting stages where contact and separation of the aqueous liquid phase and TBP phase are performed, and both phases make counter-current contact through this series of extracting stages to proceed on the extraction separation along the same principle as batch extraction. The first and third extractors in the aforesaid conventional process comprise a group of extracting stages, or extracting section, where uranium and plutonium are selectively extracted, and a group of washing stages, or washing section, where additional removal of impurities is practiced. While neptunium is supplied with Np(V) and Np(VI) into these extractors, Np(VI) is extracted in the TBP phase of the product flow near the supply stage, but Np(V) stays in the aqueous liquid phase which is the waste liquid flow. In the present invention, Np(V) is oxidized to Np(VI) by introducing nitrous acid from the extracting stages of the extractor, and the thus oxidized neptunium is extracted in the TBP phase. The remaining neptunium which did not participate in the oxidation reaction undergoes a similar oxidation reaction by nitrous acid in the subsequent extracting stages and is thus successively extracted into the TBP phase.

However, since nitrous acid is introduced from the extracting stages as described above, the nitrous acid concentration is maintained at a high level even in the washing section that succeeds the extracting section, and this may give rise to a phenomenon that Np(VI) extracted in the TBP phase of product flow is again reduced to Np(V). In other words, since no Np(VI) exists initially in the washing section, the reduction reaction to Np(V) is obliged to proceed on in accordance with aforementioned formula (1). This reducing reaction expels neptunium from the TBP phase of product flow and hence lowers the recovery yield of neptunium.

In the present invention, as aforementioned, nitrous acid is introduced to the extracting section while lowering the nitrous acid concentration in the subsequent washing section, thereby to prevent neptunium, which has once been oxidized to Np(VI) in the extracting section, from being again reduced to Np(V). For lowering the nitrous acid concentration in the washing section, either a nitrous acid decomposing agent having the ability to effectively decompose nitrous acid such as sulfamic acid or hydrazine, or else an inert gas such as argon gas or nitrogen gas, is introduced to the washing section in the extractor from the feed solution supply stages.

Further, in the present invention, the nitric acid concentration in the aqueous liquid phase in the washing section is maintained at a high level to improve the recovery yield of neptunium. When uranium is extracted into the TBP phase at high concentration in the extracting section, the TBP phase saturating effect by uranium becomes more and more conspicuous, and finally, notwithstanding the fact that the nitrous acid concentration in the washing section is maintained low as mentioned above, there is induced a reaction of reducing neptunium from Np(VI) to Np(V) owing to the saturating activity of uranium. Thus, by increasing the nitric acid concentration in the aqueous liquid phase in the washing section to suppress the reducing reaction, it is possible to increase the Np(VI) ratio to arrest the reducing reaction according to the aforementioned chemical equilibrium formula (2).

The method of the present invention is further illustrated by way of embodying examples thereof.

Figure 2:
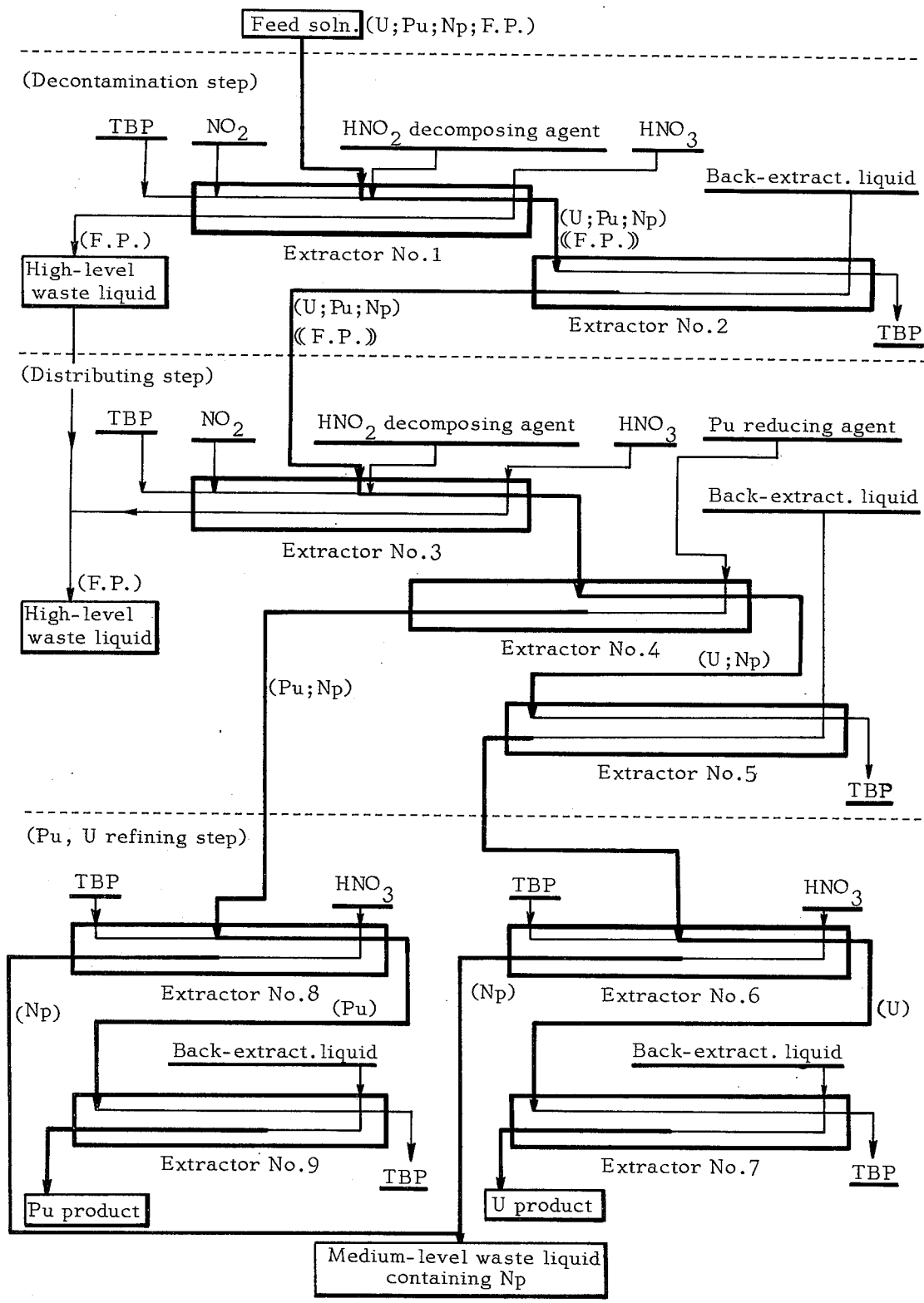
FIG. 2 is a process chart according to an embodiment of the present invention.

The spent nuclear fuel containing transuranium elements such as uranium, plutonium and neptunium, and other fission products, is first separated from the fuel canning pipes or such in the pre-treatment step and then dissolved in concentrated nitric acid in the dissolving step. Thereafter, the solute concentration is adjusted to suit the Purex solvent extraction process in the feed solution adjusting step. The above steps are carried out in the same way as in the conventional methods and shown in FIG. 1. The adjusted dissolved solution is subjected to repeated counter-current contact with the TBP extracting agent according to the improved method of the present invention, until finally uranium, plutonium and neptunium are separated from the fission products. The steps in a preferred embodiment of the present invention are systematically shown in FIG. 2. In the figure, the thick-lined arrows indicate the product flow and the thin-lined arrows indicate the waste liquid flow. The above-described dissolved solution which has been adjusted to a solute concentration suiting the Purex solvent extraction process is supplied from the feed solution supply stages as feed solution of the first extractor in the decontamination step. The feed solution composition in this embodiment is shown in Table 1.

Further, the TBP extracting reagent is supplied from the TBP supply stage. Also supplied from the same stage is a nitrous acid solution which serves to control the oxidation-reduction reaction rate and oxidation-reduction equilibration of neptunium. The composition of this nitrous acid solution is shown in Table 2. In the present invention, the nitrous acid concentration of the aqueous liquid phase in the extracting section is maintained at a level suited for effectuating oxidation of neptunium from Np(V) to Np(VI) by supplying said nitrous acid solution from the TBP supply stage. It is usually preferred to maintain the nitrous acid concentration within the range of from 5 to 10 m mol/l.

In order to maintain the nitrous acid concentration in the washing section at a sufficiently low level to prevent reduction of neptunium from Np(VI) to Np(V), hydrazine is supplied as a nitrous acid decomposing agent from the same stage as said feed solution supply stage. As a result, the aqueous liquid phase nitrous acid concentration in the washing section is maintained below 1 m mol/l. Hydrazine is most preferred as the nitrous acid decomposing agent, and it is desirable to maintain the nitrous acid concentration below 0.5 m mol/l.

The solute composition obtained in this embodiment as the first extractor product flow by the above-described operation is shown in Table 4. That is, the amount of neptunium extracted in the first extractor product flow amounts to about 60 percent of the quantity of neptunium existing in the feed solution. In the present invention, however, in order to further improve the recovery of neptunium, it is preferred to maintain the nitric acid concentration in the aqueous phase in the washing section at a high level. The first extractor product flow composition of this embodiment shown in Table 4 is one obtained when the nitric acid concentration in the washing section is adjusted to 3 mol/l. The result obtained when adjusting the nitric acid concentration to 4.5 mol/l is shown in Table 5. These results dictate that more than 90% of the entire amount of neptunium which had existed in the feed solution was extracted in the product flow.

Table 1

| First extractor feed solution composition: | |
|---|---|
| U | 180 g/l |
| Pu | 2 g/l |
| Np | 100 mg/l |
| Fission products | 6 g/l |
| $HNO_3$ | 3 mol/l |

Table 2

| Nitrous acid solution composition: | |
|---|---|
| $NaNO_2$ | 0.190 mol/l |
| NaOH | 0.02 mol/l |

Table 3

| Nitrous acid decomposing agent composition: | |
|---|---|
| $(NH_2)_2HNO_3$ | 0.143 mol/l |
| $HNO_3$ | 3 mol/l |

Table 4

| First extractor product flow composition: (nitric acid concentration in washing section: 3 mol/l) | |
|---|---|
| U | 85 g/l |
| Pu | 0.94 g/l |
| Np | 30 mg/l |
| $HNO_3$ | 0.2 mol/l |

Table 5

| First extractor product flow composition: (nitric acid concentrating in washing section: 4.5 mol/l) | |
|---|---|
| U | 85 g/l |
| Pu | 0.94 g/l |
| Np | 43 mg/l |
| $HNO_3$ | 0.2 mol/l |

The product flow in the first extractor is of a TBP phase, but it is back-extracted into the aqueous liquid phase in the second extractor and then fed into the third extractor. The third extractor is provided for accomplishing further removal of fission products from uranium and plutonium. It is substantially identical with the first extractor except for the feed solution composition.

According to an embodiment in the third extractor, feed solution 1 and feed solution 2 having the compositions shown in Tables 6 and 7, respectively, are supplied to the third extractor and passed through the extracting and washing sections under the same conditions as the first extractor. The compositions of the thus obtained third extractor product flows are shown in Tables 8 and 9. Table 8 shows the results obtained by using the feed solution 1 of Table 6, and Table 9 shows the results obtained by using the feed solution of Table 7.

The neptunium recovery was about 40 percent as against the third extractor feed solution in the case of feed solution 1 and about 90 percent in the case of feed solution 2. These results were obtained under the condition where the nitric acid concentration in the washing section was maintained as high as 4.5 N. When the nitric acid concentration was decreased to 3 N, the neptunium recovery was lowered below 5 percent.

Table 6

| Third extractor feed solution 1: | |
|---|---|
| U | 55 g/l |
| Pu | 0.61 g/l |
| Np | 28 mg/l |
| $HNO_3$ | 3 N |

Table 7

| Third extractor feed solution 2: | |
|---|---|
| U | 180 g/l |
| Pu | 2 g/l |
| Np | 90 mg/l |
| $HNO_3$ | 3 N |

Table 8

| Third extractor product flow composition 1: | |
|---|---|
| U | 80 g/l |
| Pu | 0.90 g/l |
| Np | 20 mg/l |
| $HNO_3$ | 0.2 N |

Table 9

| Third extractor product flow composition 2: | |
|---|---|
| U | 80 g/l |
| Pu | 0.90 g/l |
| Np | 40 mg/l |
| $HNO_3$ | 0.2 N |

The TBP phase product flow from the third extractor is introduced to the fourth extractor and here it is distributed to plutonium and uranium, but neptunium is distributed to both of the uranium product flow and plutonium product flow. Neptunium distributed to the uranium product flow is entirely contained in the waste liquid of the sixth extractor and turned into a medium-radioactive waste liquid. On the other hand, neptunium distributed to the plutonium product flow is separated from plutonium due to presence of the very dilute neptunium reducing agent in the aqueous phase in the eighth extractor and turned into a medium-radioactive waste liquid. The latter is joined with the waste liquid from the sixth extractor, and neptunium can be recovered in a desired form from this medium-radioactive waste liquid.

As described above in detail, according to the method of the present invention which is employed in the first and third extractor step in the conventional Purex wet recovery process, that is, in the step of extracting and separating uranium and plutonium existing in the feed solution simultaneously from the fission products, it is possible to efficiently recover neptunium without affecting recovery of uranium and plutonium. Also, according to the present invention, it is possible to extract more than 80 percent of neptunium contained in the initial solution in which spent nuclear fuel is dissolved.

What we claim is:

1. In a method of separating and recovering neptunium contained in a spent nuclear fuel simultaneously with uranium and plutonium comprising the steps of
   dissolving the spent nuclear fuel containing uranium, plutonium, neptunium and other fission products in a nitric acid solution to form a feed solution, and
   counter-currently contacting said feed solution with an extracting agent of tributyl phosphate in the presence of nitric acid and nitrous acid in a multistage extractor unit having an extracting section and a washing section to extract uranium, plutonium and neptunium into said extracting agent, the improvement wherein
   the concentration of said nitrous acid in said extractor is maintained at a level suited for effecting oxidation of neptunium from Np(V) to Np(VI) by introducing nitrous acid into said extracting section, while said nitrous acid is maintained at a lower level in said washing section to suppress the reduction of neptunium from Np(VI) to Np(V) by introducing a nitrous acid decomposing agent into said washing section,
   the concentration of said nitric acid in said extractor being maintained at a high level in said washing section by introducing nitric acid into said washing section.

2. The method according to claim 1, wherein said nitrous acid decomposing agent is hydrazine.

3. The method according to claim 1, wherein the nitrous acid concentration in said extracting section is maintained at 5 to 10 mol/l and the nitrous acid concentration in said washing section is lowered below 1 m mol/l.

4. The method according to claim 1, wherein the nitric acid concentration in said washing section is increased above 3 mol/l.

5. In a method of separating and recovering neptunium contained in a spent nuclear fuel simultaneously with uranium and plutonium comprising the steps of
   dissolving the spent nuclear fuel containing uranium, plutonium, neptunium and other fission products in a nitric acid solution to form a feed solution, and
   counter-currently contacting said feed solution with an extracting agent of tributyl phosphate in the presence of nitric acid and nitrous acid in a multistage extractor unit having an extracting section and a washing section to extract uranium, plutonium and neptunium into said extracting agent, the improvement wherein
   the concentration of said nitrous acid in said extractor is maintained at a level suited for effecting oxidation of neptunium from Np(V) to Np(VI) by introducing nitrous acid into said extracting section, while said nitrous acid is maintained at a lower level in said washing section to suppress the reduction of neptunium from Np(VI) to Np(V) by introducing an inert gas into said washing section,
   the concentration of said nitric acid in said extractor being maintained at a high level in said washing section by introducing nitric acid into said washing section.

6. The method according to claim 5, wherein the nitrous acid concentration in said extracting section is maintained at 5 to 10 mol/l and the nitrous acid concentration in said washing section is lowered below 1 m mol/l.

7. The method according to claim 5, wherein the nitric acid concentration in said washing section is increased above 3 mol/l.

* * * * *